P. E. KOPP.
CHANGE COMPUTER.
APPLICATION FILED JUNE 30, 1921.
1,410,195. Patented Mar. 21, 1922.
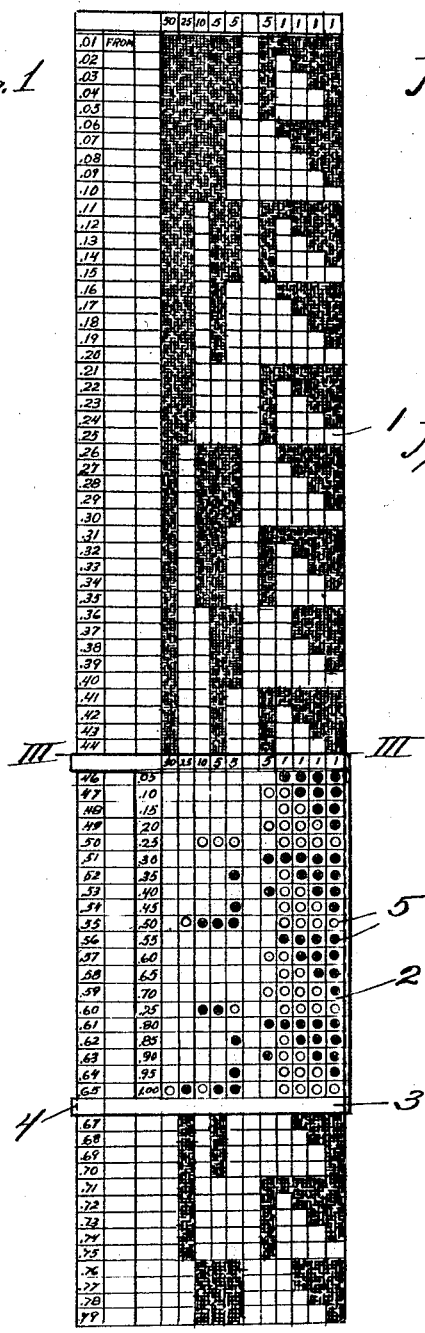
Fig. 1
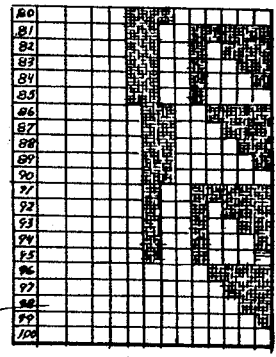
Fig. 2
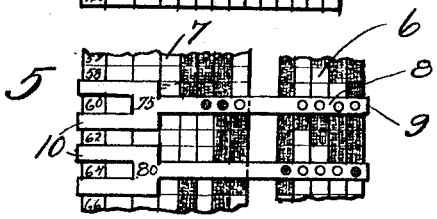
Fig. 5
Fig. 3
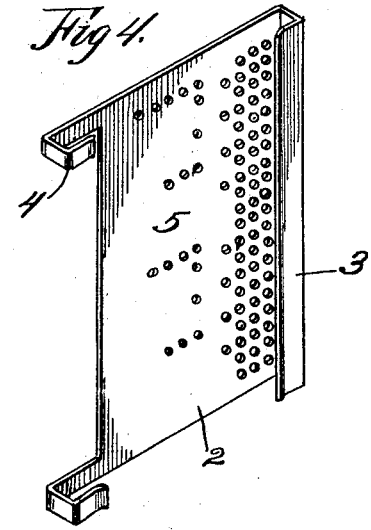
Fig. 4
Witness:
R. E. Hamilton
Inventor
P. E. Kopp.
By Thorpe & Girard
Attorneys

UNITED STATES PATENT OFFICE.

PHILIP E. KOPP, OF KANSAS CITY, MISSOURI.

CHANGE COMPUTER.

1,410,195.  Specification of Letters Patent.  Patented Mar. 21, 1922.

Application filed June 30, 1921. Serial No. 481,523.

*To all whom it may concern:*

Be it known that I, PHILIP E. KOPP, a citizen of the United States, residing at Kansas City, in the county of Jackson and State of Missouri, have invented a certain new and useful Improvement in Change Computers, of which the following is a complete specification.

This invention relates to change computing charts and has for its object to produce a sliding chart of such character that the amount of change for any amount less than $1.00 may be rapidly and accurately computed.

A further object is to produce a scale of this character which can be adapted for use with a rotating drum or which can be made in the form of a metal or paper strip.

Another object is to produce a chart which is simple and comparatively cheap of manufacture, and in order that it may be fully understood, reference is to be had to the accompanying drawing, in which:—

Figure 1 is a face view of the chart with the sliding scale in position.

Figure 2 is a continuation of the chart as shown in Figure 1.

Figure 3 is a section on the line III—III of Figure 1.

Figure 4 is an inverted rear perspective view of the sliding scale.

Figure 5 is a face view of a modified form of the device.

The device of the invention, as illustrated in the drawing, consists essentially of a rectangular strip 1 of wood, metal or other suitable material, and is transversely divided into 101 horizontal rows, each row after the first one being marked in a vertical column at the left hand side of the chart with numerals indicating cents, beginning with .01 and ending with 1.00.

The scale, as illustrated, is provided with thirteen additional columns besides the cents column, the first column being headed by the word "From" for the purpose which will hereinafter appear, the second column being blank, the third, fourth, fifth, sixth and seventh columns being headed in the first row with the figures 50, 25, 10, 5 and 5, respectively, to indicate $.50, $.25, $.10, $.05, and $.05 as will hereinafter appear, the eighth column is blank, and the remaining columns are respectively headed by the figures 5, 1, 1, 1, and 1, to indicate $.05, $.01, $.01, $.01, and $.01.

The remainder of the chart is thus blocked out by the columns and rows into a series of squares, certain of the squares corresponding to a predetermined column and row being colored distinctively from the remaining squares, said color being applied in accordance with a predetermined plan in order that when the sliding scale is used, the colors shall appear through perforations in the latter as will hereinafter appear.

The sliding scale consists of a plate 2, preferably of metal and provided at one side with a right-angle shaped arm 3 adapted to engage one side edge of the chart, and at the other edge with a pair of hooks 4 adapted to engage the opposite edge of the chart. It will, of course, be understood that the arm and hooks act merely as guides in the sliding of the scale and also to hold the scale at any desired point of adjustment. By referring to the drawing, Figure 1, it will be noted that the scale is of such width that it will not hide or cover the first two vertical columns appearing on the chart.

The scale 2 is provided with twelve vertical columns and twenty-one horizontal rows. The first column beginning with the second row is marked with the figures .05, and each row in said column is thereafter marked with figures increasing by 5 until the number 1.00 is attained, and said figures respectively indicate amounts ranging from $.05 to $1.00. The remaining columns are provided with markings corresponding to the coinciding columns of the chart, and said markings occupy the uppermost row of the scale as described in connection with the chart.

The scale is thus blocked out by the rows and columns into a series of squares, certain of which are perforated as at 5 in accordance with a predetermined plan, and the colored squares of the chart may be seen through said perforations as will hereinafter appear.

The operation of the chart is, as follows: For example, a purchaser buys something of the value of $.60 and pays $.75, he should receive $.15 in change. The cashier will immediately slide the scale on the chart until the number .75 coincides with the row marked 60 in the first column of the chart.

He will then give the change in amount corresponding to the total value of all the columns in which a color appears through a perforation in said .75 row which, in this instance, will be 10 and 5, indicating that $.15 should be given in change. Also for example, a purchaser pays $1.00 for something of the value of $.65. Referring to the colors appearing through the perforations in the scale and the figures at the top of the corresponding columns, it will be seen that the columns corresponding to the Figures 25, 5 and 5, appear in color, indicating that $.35 should be given in change.

In the modified form of the device as shown in Figure 5, the chart consists of a pair of members 6 and 7 identified in a similar manner to the chart 1. The scale instead of being composed of one member divided into 21 rows, consists of twenty scale members respectively identified from .05 to 1.00, and each is provided at one side with a right-angle shaped arm 9, and at the other with a pair of arms 10 of similar character, as illustrated, to act as guides and is separately slidable on the scales, as will be readily understood.

From the above description it will be apparent that I have produced a change computer possessing all of the features of advantage pointed out as desirable, and while I have described and claimed the preferred embodiment of the same, I reserve the right to make all changes properly falling within the spirit and scope of the appended claims.

I claim:—

1. In a change computer, the combination of a pair of relatively movable members, one of said members being provided with a vertical column of equi-spaced figures increasing by one and dividing said member into horizontal rows, and with a plurality of change-indicating columns intersecting the said rows, certain intersecting points in said columns and rows being distinctively identified; the second member of said pair, being provided with a vertical column of figures increasing by five and dividing it into horizontal rows, and with a plurality of columns coinciding with the change-indicating columns of said first member; said second member also being provided with a plurality of means in each row for cooperating with certain of the distinctively-identified points of said first member, the total value of the distinctively-identified points in a row of said first member cooperating with a row of the means of said second member, equaling in amount the difference between the amounts of the figures of the vertical columns of said members appearing in the plane of such cooperating rows.

2. In a change computer, the combination of a pair of relatively movable members, one of said members being provided with a vertical column of equi-spaced figures increasing by one and dividing said member into horizontal rows, and with a plurality of change indicating columns intersecting the said rows, certain intersecting points in said columns and rows being distinctively identified; the second member of said pair being provided with a vertical column of figures spaced apart an equal distance to the distance between the figures of the vertical column of the first member and increasing by five and dividing said member into horizontal rows, and with a plurality of columns coinciding with the columns of said first member, said second member being also provided with a plurality of perforations in each row for exposing certain of the distinctively identified points of the first-named member, the total value of distinctively identified points of the first member exposed in one row by a certain row of perforations in the second member, equaling the difference between the amounts of the figures of the vertical columns of said members appearing in the plane of such row.

3. In a change computer, the combination of a chart and a scale, the former being composed of a plurality of members, one of said members being provided with a vertical column of equi-spaced figures increasing by one and dividing said member into horizontal rows, said rows coinciding with similar rows on the other members, and each member having a plurality of change indicating columns intersecting said rows, certain intersecting points in said columns and rows being distinctively identified; the scale being provided with a vertical columns of similarly equi-spaced figures increasing by five and dividing said member into horizontal rows, and with a plurality of columns coinciding with the columns of said chart, said scale being also provided with a plurality of perforations for exposing certain of the distinctively identified points of the chart, the total value of distinctively identified points of the first member exposed in one row by a certain row of perforations in the second member, equaling the difference between the amounts of the figures of the vertical columns of said members appearing in the plane of such row.

4. In a change computer, the combination of a chart and a scale, the former being provided with a vertical columns of equi-spaced figures increasing by one and dividing said member into horizontal rows, and with a plurality of change indicating columns intersecting said rows, certain intersecting points in said columns and rows being distinctively identified; the scale being composed of a plurality of members, each adapted for sliding engagement with the chart, and each bearing an identifying number and with a plurality of columns coinciding with the columns of the chart, each member of said scale being also provided with a plurality of perforations for exposing certain of the distinctively identified points of the chart, the total value of distinctively identified points of the first member exposed in one row by a certain row of perforations in the second member, equaling the difference between the amounts of the figures of the vertical columns of said members appearing in the plane of such row.

In witness whereof I hereunto affix my signature.

PHILIP E. KOPP.